(12) United States Patent
Rasmussen

(10) Patent No.: US 8,056,654 B2
(45) Date of Patent: Nov. 15, 2011

(54) SNOWMOBILE EXHAUST SYSTEM

(75) Inventor: Brett Rasmussen, Preston, ID (US)

(73) Assignee: Boondocker, LLC, Idaho Falls, ID (US)

( * ) Notice: Subject to any disclaimer, the term of this patent is extended or adjusted under 35 U.S.C. 154(b) by 0 days.

(21) Appl. No.: 12/714,462

(22) Filed: Feb. 27, 2010

(65) Prior Publication Data

US 2010/0243343 A1 Sep. 30, 2010

Related U.S. Application Data

(60) Provisional application No. 61/156,439, filed on Feb. 27, 2009.

(51) Int. Cl.
*B62D 55/07* (2006.01)
(52) U.S. Cl. ........ 180/9.1; 180/68.3; 180/89.2; 180/190
(58) Field of Classification Search ............... 180/9, 9.1, 180/68.3, 190, 193, 309
See application file for complete search history.

(56) References Cited

U.S. PATENT DOCUMENTS

| 5,279,381 | A * | 1/1994 | Fukuda | 180/190 |
| 7,264,075 | B2 * | 9/2007 | Schuemacher et al. | 180/190 |
| 2006/0175107 | A1 * | 8/2006 | Etou | 180/190 |

\* cited by examiner

*Primary Examiner* — Lesley Morris
*Assistant Examiner* — Jacob Knutson
(74) *Attorney, Agent, or Firm* — Eric M. Barzee

(57) ABSTRACT

An exhaust system is provided for a snowmobile having a front portion in which an engine is mounted, a rearward portion, and a track belt for propelling the snowmobile. The track belt is in a track belt tunnel that extends from behind the engine to a rear portion of the snowmobile. The exhaust system includes an exhaust pipe that extends from an exhaust outlet of the engine to the track belt tunnel. At least one exhaust outlet is located within the track belt tunnel at a position within the inner circumference of the track belt.

16 Claims, 3 Drawing Sheets

SNOWMOBILE EXHAUST SYSTEM

RELATED APPLICATIONS

This patent application claims priority to the U.S. provisional patent application Ser. No. 61/156,439 entitled "SNOWMOBILE EXHAUST SYSTEM" filed on Feb. 27, 2009 which is incorporated in its entirety by reference and made a part hereof.

BACKGROUND OF THE INVENTION

1. Field of the Invention

The invention relates to recreational vehicles. In particular the invention relates to an exhaust system for snowmobiles.

2. State of the Art

Conventional snowmobiles have a front end and a rear end. The Front end of the snowmobile houses the engine which sits under a hood and above a set of skis. The engine drives a track that extends from near the engine compartment to the rear of the snowmobile. The snowmobile is operated by a rider who sits on a seat behind the engine compartment and above the track. The rider steers the snowmobile through handlebars that are connected to the skis. Other controls such as the throttle control, brake controls, engine kill, and start control are also within the reach of the operator generally on the handlebars.

Because the snowmobile is powered by an internal combustion engine, the engine produces exhaust gas that must be discharged to the atmosphere. Generally, this exhaust gas is discharged through an outlet below the engine compartment. For example in most snowmobiles, the exhaust outlet is located in the floor of the engine compartment and generally on one side or the other.

However, as the snowmobile is ridden in snow, especially deep or powder snow, the exhaust outlet can become obstructed with snow and impair engine performance or even cause the engine to stall.

Many attempts have been made to create a snowmobile exhaust system with an exhaust outlet that does not easily become obstructed with snow. For example in some snowmobiles, the exhaust system is expensive and complex with a tail pipe that extends from the engine compartment, under the seat and above the track to the rear of the snowmobile where the exhaust is discharged to the atmosphere. Such exhaust systems may require a special channel in the seat and are difficult to install as an aftermarket modification. Other exhaust systems place the exhaust outlet near the front of the snowmobile, under the engine compartment, or on the side of the engine compartment. However, these designs all suffer from the same problems, namely they are costly and/or may still become obstructed by snow as the snowmobile is ridden.

BRIEF SUMMARY OF THE INVENTION

An exhaust system is provided for a snowmobile having a front portion in which an engine is mounted in an engine compartment, a rearward portion, and a track belt for propelling the snowmobile. The track belt is positioned in a track tunnel that extends from behind the engine compartment to a rear portion of the snowmobile. The track belt has an outer surface that directly contacts snow and an inner surface. The track belt makes a loop creating a space within the inner circumference. The tunnel may be defined further by first and second lateral frame walls. The first and second lateral frame walls may taper as they extending from the front portion to the rearward portion. The track tunnel may be open at the bottom with the bottom portion of the tunnel defined generally by the ground or the bottom portion of the track belt. The exhaust system includes an exhaust pipe that extends from an exhaust port of the engine to the track belt tunnel. At least one exhaust outlet is located within the track belt tunnel thereby discharging the exhaust gas into the track belt tunnel. The exhaust outlet may be positioned within the inner circumference of the track belt and discharge the exhaust within the inner circumference of the track belt.

The exhaust system may include an exhaust pipe that extends substantially rearward from the engine compartment. The exhaust pipe may include an elbow that turns the exhaust pipe toward the track tunnel. The exhaust pipe may extend from the engine to the track tunnel. An exhaust outlet is configured to discharge the engine exhaust within the track tunnel.

The exhaust pipe may extend from a rear portion of the engine compartment external to the track tunnel and enter the track tunnel through the first or second lateral frame walls. In such configurations, the exhaust pipe may enter the track tunnel through position adjacent a rear portion of the engine compartment. A foot rest or other covering may be positioned over any portion of the exhaust pipe that is external to the engine compartment and the track tunnel. A baffle may be positioned near the exhaust outlet. The baffle may be positioned forward of exhaust outlet. In other configurations, the baffle may be positioned behind the exhaust outlet. In yet other configurations two or more baffles may be used.

The present invention also relates to methods of discharging exhaust of a snowmobile. The method may include the step of conveying the exhaust from the engine to the track belt tunnel and discharging the exhaust within the track belt tunnel. The exhaust may be discharged in the front portion of the tunnel. The exhaust may be discharged within the circumference of the track belt.

DETAILED DESCRIPTION OF THE INVENTION

Before the present system and methods of use thereof for producing an accurate likeness are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be determined by the appended claims and equivalents thereof.

As used herein, "comprising," "including," "having," "containing," "characterized by," and grammatical equivalents thereof are inclusive or open-ended terms that do not exclude additional, unrecited elements or method acts.

As used herein, "about" means reasonably close to, a little more or less than the stated number or amount, or approximately.

As used herein, "exemplary" means serving as an example of. The use of the term "exemplary" herein in connection with a particular embodiment is not to be construed as the particular embodiment being preferred over any other embodiment.

Figure 1:
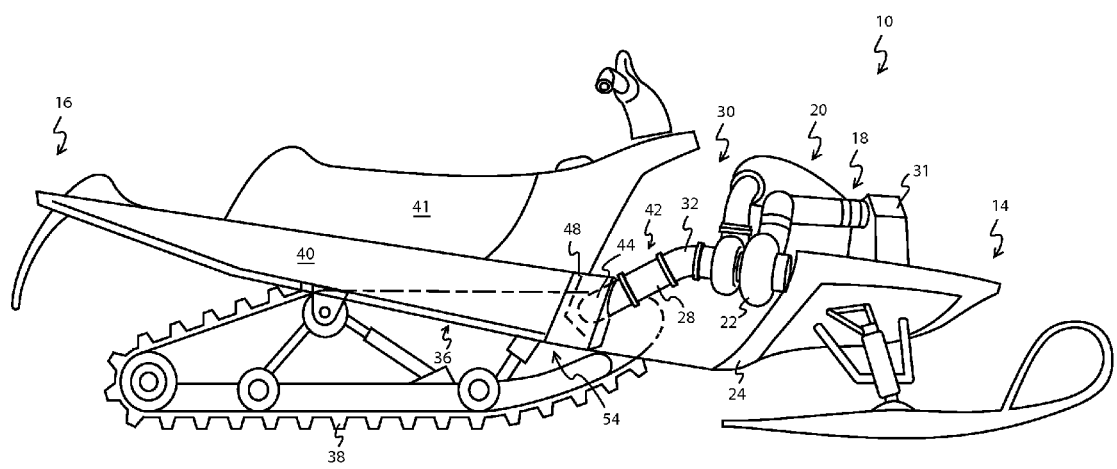
FIG. 1 is a side perspective view of a snowmobile having the exhaust system of the present invention.
Figure 2:
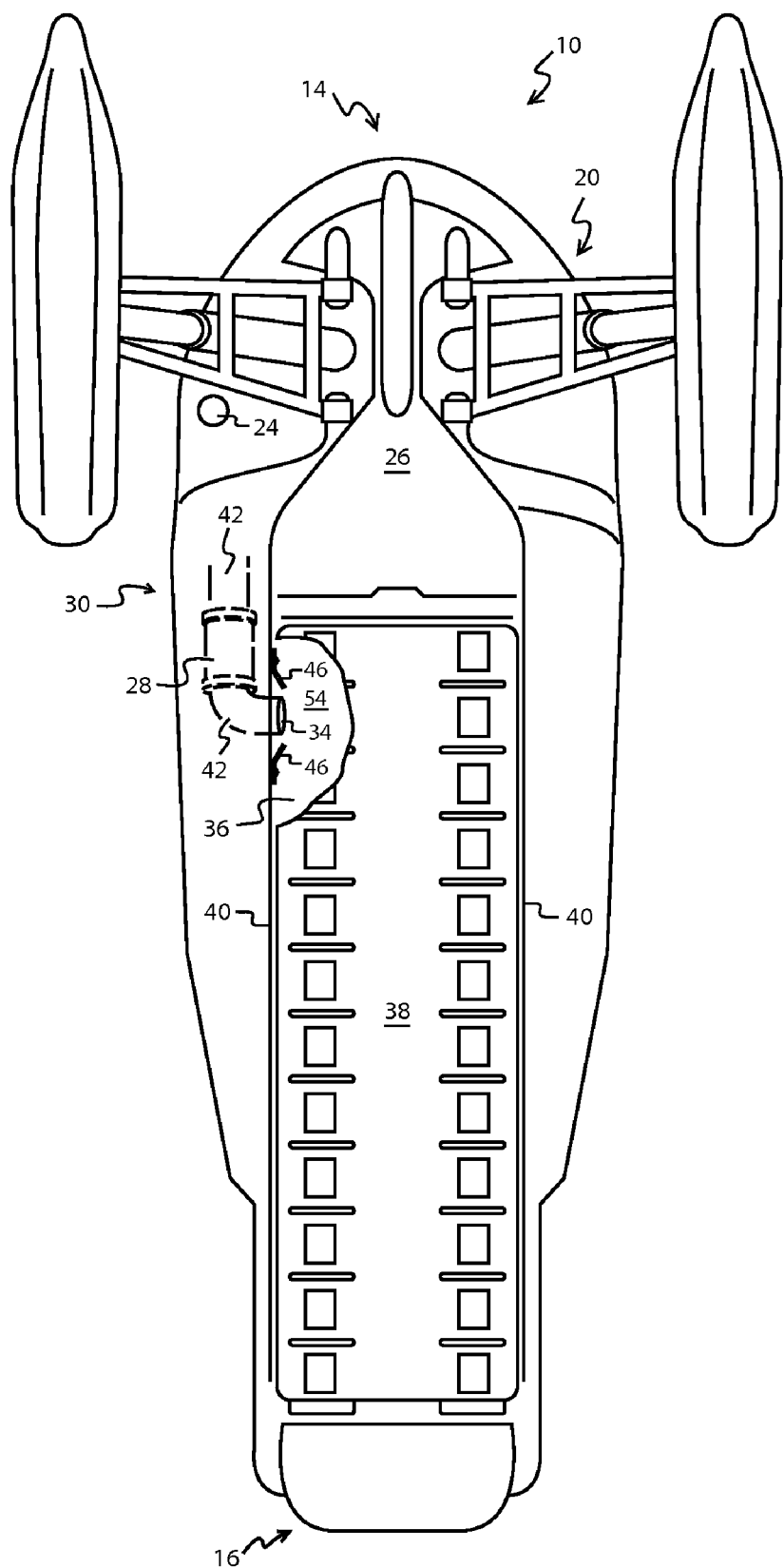
FIG. 2 is a bottom perspective view of a snowmobile having the exhaust system of the present invention.
Figure 3:
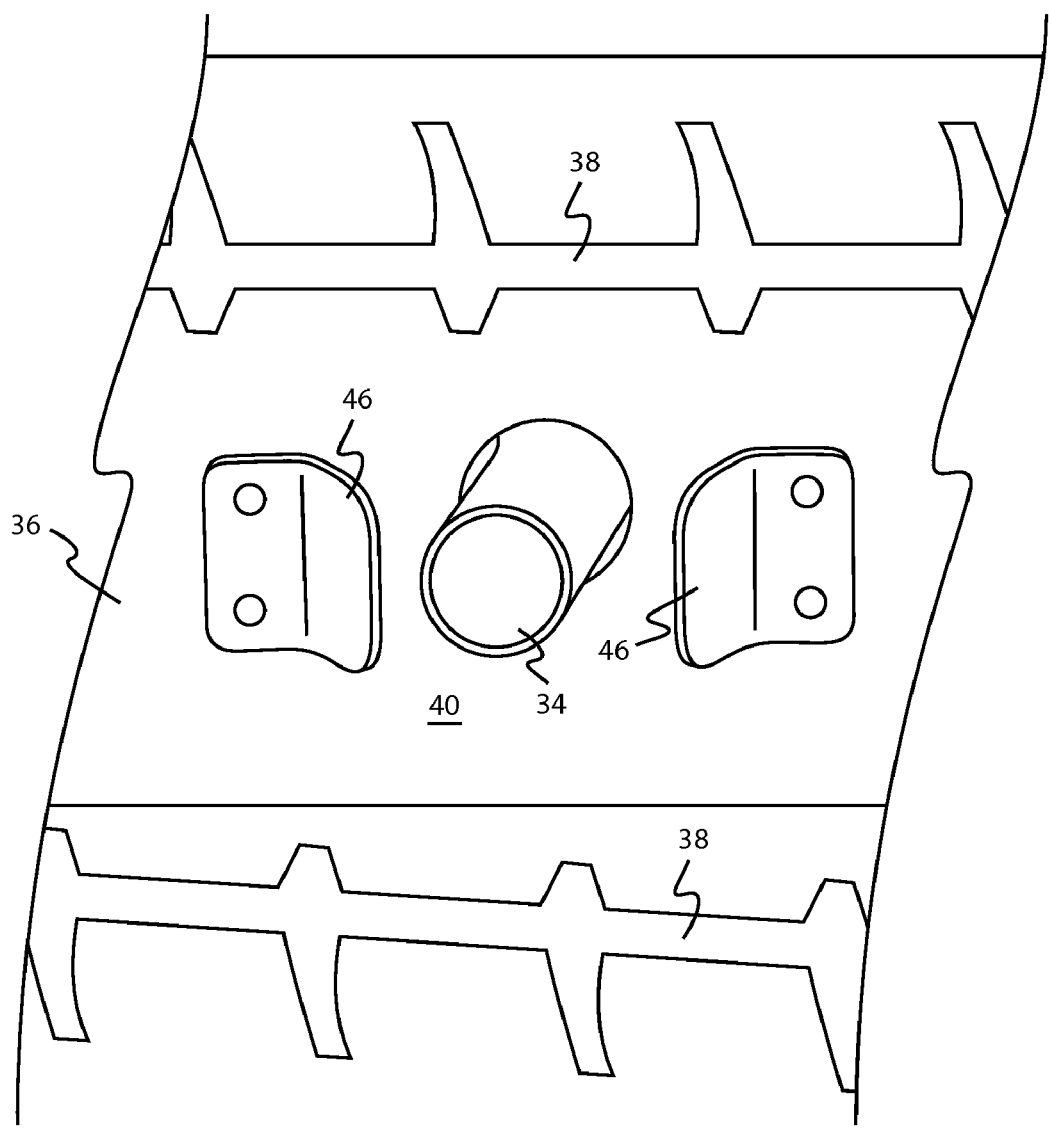
FIG. 3 is a perspective view of an exhaust outlet within the track belt tunnel of the snowmobile.

Referring to FIGS. 1-3 an exemplary embodiment of a snowmobile 10 having the exhaust system 30 of the present invention is shown. The snowmobile 10 has a front end 14 and a rear end 16. The engine 18 is located within the engine compartment 20 under a hood. The snowmobile 10 in the illustrations is shown without the hood for convenience of describing the exhaust system. The snowmobile also includes an air intake 31 and an exhaust system 30. In the illustrated snowmobile a turbo 22 is also included. The exhaust system 30 is configured to take the engine exhaust from the engine 18 and discharge it to the atmosphere. The exhaust system 30 includes an exhaust pipe 32 that extends from the engine 18 or turbo 22 to an exhaust outlet 32.

In a traditional snowmobile, the exhaust outlet 24 is located within the engine compartment at a forward position such as traditional outlet 24 in the engine compartment floor 26. At these locations the outlet 24 may become obstructed with snow impairing engine performance.

In the present system, the exhaust pipe 32 may be configured to travel rearward from the engine compartment 20 and then into the track belt tunnel 36. The track belt tunnel 36 houses the track belt 38 and other drive and suspension components. The track belt tunnel 36 is defined by first and second lateral frame walls 40 the bottom portion of the seat 41 or the frame below the seat 41, the rear of the engine compartment 20, and the rear of the snowmobile 16.

After numerous attempts to overcome the problems with the clogging of the exhaust outlet in deep snow, it was determined that by locating the exhaust outlet 34 within the track belt tunnel 36 the outlet 34 could be kept clog free. In particular, the exhaust outlet 34 may be located within the track belt tunnel 36 at a position within the circumference 58 of the track belt 38. In other words, the exhaust outlet 35 is located within the area 54 defined by the first and second lateral walls 40 and the inner surface of the track belt 38. As the snowmobile 10 travels through snow this area 54 within the inner circumference of the track belt 38 is relatively free of snow with a pocket of air.

Thus, the exhaust system 30 of the present invention has an exhaust outlet 34 that is configured to discharge the exhaust into the track belt tunnel 36. As the track belt 38 spins it glides on top of the snow and spins any snow out the back end 14 of the snowmobile 10. Thus, the track belt tunnel 36, especially within the inner circumference of the track belt 38 is kept free of snow even in the deepest powder snow. This snow free area 54 has an air pocket that has proven ideal to discharge the exhaust gas.

There are many configurations that the exhaust system 30 of the present invention could take to discharge the exhaust within the track belt tunnel 36. For example the exhaust pipe 32 may have a straight portion 42 and an elbow 44 that turns at a substantially right angle through the frame wall 40 into the track belt tunnel 36. In other embodiments, the exhaust pipe 32 may travel more directly from the back of the engine compartment 20 into the track tunnel 36 without any portion of the pipe 32 being external to the engine compartment 20 and track tunnel 36.

In certain embodiments, the exhaust pipe 32 may exit the engine compartment within a foot rest 48. The exhaust pipe 32 may also enter the track belt tunnel 36 under the foot rest 48. Thus, the exhaust pipe 48 may be disguised and shielded by the foot rest 48. Alternatively, other shielding may be used to protect both the exhaust pipe 49 and the rider of the snowmobile.

One or more baffles 46 may be positioned near the exhaust outlet 34. The baffles may shield the exhaust outlet 34 from clogging snow. Further, the baffles 46 can divert the hot and potentially corrosive exhaust gas away from sensitive parts of the snowmobile such as the track belt 38 and the suspension that may be damaged by the exhaust gas. The one or more baffles 46 may be located at various positions around the exhaust outlet 34 depending on sensitive part that is being protected. For example, a baffle may be positioned in front of the outlet 34 to protect suspension and drive components of the snowmobile 10 that are located in front of the outlet 34. Likewise, a baffle 46 may be located behind, below, or above the outlet 34 to direct the exhaust gas away from sensitive components that are behind, below, or above the outlet 34.

The exhaust outlet 34 may be located near the front of the track tunnel 36 as shown, or may be located more distally from the front of the track tunnel 36. The exhaust pipe 32 may also contain more than one exhaust outlet 34. For example, the exhaust pipe 32 may have a branch that creates one or more exhaust ports 34. Alternatively, the exhaust pipe 32 may extend into the track tunnel 36 and have one or more holes for the exhaust to exit the pipe 32.

A snowmobile was equipped with the exhaust system of the present invention with the exhaust outlet located in the tunnel and within the track. The snowmobile was started in powder snow and the sound level was tested using standard methods and at a standard distance. Unexpectedly, the sound level measured was under 85 dB. When a similar snowmobile, but with the exhaust outlet located in a prior art location beneath the engine compartment, was tested under substantially similar conditions, the sound levels measured were above 100 dB.

The present invention also relates to a method of discharging the exhaust of a snowmobile 10. The snowmobile 10 may have an engine compartment in which an engine 18 is mounted, a rearward portion 16, and a track belt 38 for propelling the snowmobile, the track belt 38 being positioned in a track tunnel 36 defined by the a first lateral frame wall 50, a second lateral frame wall 50. The method includes the step of conveying the exhaust from the engine 18 to the track belt tunnel 36 and discharging the exhaust within the track belt tunnel 36 such as within area within the circumference of the track belt 38. In certain embodiments the exhaust is discharged within a front portion of the tunnel 36. Additionally the exhaust may be discharged within the circumference 54 of the track belt 38.

The present invention also relates to a method of reducing the noise emitted by a snowmobile 10. The snowmobile 10 may have an engine compartment in which an engine 18 is mounted, a rearward portion 16, and a track belt 38 for propelling the snowmobile, the track belt 38 being positioned in a track tunnel 36 defined by the a first lateral frame wall 50, a second lateral frame wall 50. The method includes the step of conveying the exhaust from the engine 18 to the track belt tunnel 36 and discharging the exhaust within the track belt tunnel 36 thereby reducing the noise emitted by the snowmobile 10. In certain embodiments the exhaust is discharged within a front portion of the tunnel 36. Additionally the exhaust may be discharged within the circumference 54 of the track belt 38.

The invention claimed is:

1. An exhaust system for a snowmobile, the snowmobile having an engine compartment in which an engine is mounted, a rearward portion, and a track belt for propelling the snowmobile, the track belt having an inner circumference, the track belt extending from the engine compartment to the rearward portion and disposed in a track tunnel defined by a first lateral frame wall, a second lateral frame wall, the exhaust system comprising:

an exhaust pipe extending from the engine to the track tunnel, the exhaust pipe including an exhaust outlet within the track tunnel, the exhaust outlet positioned within the tunnel between the first and second lateral frame walls and the inner circumference of the track belt.

2. The exhaust system of claim 1, wherein the exhaust pipe exits the engine compartment at a position external to the track tunnel and enters the track tunnel through the first or second lateral frame wall.

3. The exhaust system of claim 2, wherein the exhaust pipe enters the track tunnel at position adjacent the engine compartment.

4. The exhaust system of claim 3, wherein a portion of the exhaust pipe that is external to the engine compartment and the track tunnel is covered by a foot rest.

5. The exhaust system of claim 1, further comprising a baffle for deflecting exhaust gas.

6. The exhaust system of claim 5, further comprising a second baffle for deflecting exhaust gas.

7. The exhaust system of claim 5, wherein the baffle is positioned forward of the exhaust outlet.

8. An exhaust system for a snowmobile, the snowmobile having an engine compartment in which an engine is mounted, a rearward portion, and a track belt for propelling the snowmobile, the track belt having an inner circumference, the track belt extending from the engine compartment to the rearward portion and being disposed in a track tunnel defined by a first lateral frame wall, a second lateral frame wall, the exhaust system comprising:

an exhaust pipe extending from the engine to the track tunnel, the exhaust pipe including an exhaust outlet within the track tunnel within the inner circumference of the track belt, the exhaust pipe entering the track tunnel at position adjacent the engine compartment.

9. The exhaust system of claim 8, wherein a portion of the exhaust pipe that is external to the engine compartment and the track tunnel is covered by a foot rest.

10. The exhaust system of claim 8, further comprising a baffle for deflecting exhaust gas.

11. The exhaust system of claim 10, further comprising a second baffle for deflecting exhaust gas.

12. The exhaust system of claim 10, wherein the baffle is positioned forward of the exhaust outlet.

13. The exhaust system of claim 12, wherein the exhaust pipe extends from a rear portion of the engine compartment external to the track tunnel and enters the track tunnel through the first or second lateral frame wall.

14. A method of discharging exhaust of a snowmobile, the snowmobile having an engine compartment in which an engine is mounted, a rearward portion, and a track belt for propelling the snowmobile, the track belt being positioned in a track tunnel being defined by the a first lateral frame wall, a second lateral frame wall, comprising:

conveying the exhaust from the engine to the track belt tunnel and discharging the exhaust to the atmosphere within the track belt tunnel through an exhaust outlet positioned within the inner circumference of the track belt.

15. The method of claim 14, wherein the exhaust is discharged within a front portion of the tunnel.

16. The method of claim 14, further comprising deflecting the discharged exhaust away from sensitive parts of the snowmobile.

\* \* \* \* \*